United States Patent
Choi

(10) Patent No.: US 11,794,644 B2
(45) Date of Patent: Oct. 24, 2023

(54) DEVICE AND METHOD FOR PROVIDING NOTIFICATION OF OCCURRENCE OF VEHICLE ACCIDENT

(71) Applicants: Hyundai Motor Company, Seoul (KR); Kia Corporation, Seoul (KR)

(72) Inventor: Hyunwoo Choi, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/474,380

(22) Filed: Sep. 14, 2021

(65) Prior Publication Data
US 2022/0169175 A1 Jun. 2, 2022

(30) Foreign Application Priority Data

Nov. 30, 2020 (KR) .................... 10-2020-0164975

(51) Int. Cl.
*B60Q 9/00* (2006.01)
*H04W 4/40* (2018.01)
*H04L 1/18* (2023.01)

(52) U.S. Cl.
CPC ............... *B60Q 9/00* (2013.01); *H04L 1/18* (2013.01); *H04W 4/40* (2018.02)

(58) Field of Classification Search
CPC ........ G08B 21/245; G08B 7/06; G08B 25/10; G08B 29/18; G08B 25/007; G06F 1/163; G06F 3/016; B60Q 9/00; H04L 1/18; H04L 1/16; H04L 1/20; H04L 1/08; H04W 4/40; H04W 4/44; H04W 4/90
See application file for complete search history.

(56) References Cited

U.S. PATENT DOCUMENTS

| | | | | |
|---|---|---|---|---|
| 5,546,411 A | * | 8/1996 | Leitch | H04L 1/0026 340/10.2 |
| 2010/0061311 A1 | * | 3/2010 | Wang | H04W 72/542 370/329 |
| 2015/0071267 A1 | * | 3/2015 | Wu | H04W 52/48 370/336 |
| 2015/0199895 A1 | * | 7/2015 | Hilliges | G08B 25/018 340/425.5 |
| 2016/0277997 A1 | * | 9/2016 | Kang | H04W 40/22 |
| 2016/0308743 A1 | * | 10/2016 | Alam | H04L 43/10 |

(Continued)

FOREIGN PATENT DOCUMENTS

JP       2000285376 A    * 10/2000

*Primary Examiner* — An T Nguyen
(74) *Attorney, Agent, or Firm* — Fox Rothschild LLP

(57) ABSTRACT

A device and method are configured to provide a notification of an occurrence of a vehicle accident when an airbag is deployed. The device acquires an intensity of a signal received from a server for at least one communication medium, transmits a notification including information on an occurrence of an accident to the server when an airbag of a vehicle is deployed, and retransmits the notification based on the intensity of the received signal when the transmission of the notification has failed. When the transmission of the notification including the information on the occurrence of the accident has failed because a wireless network communication is not operating correctly, wireless communication connection may be reattempted the appropriate number of times to increase a success rate.

9 Claims, 11 Drawing Sheets

(56) References Cited

U.S. PATENT DOCUMENTS

| | | | |
|---|---|---|---|
| 2017/0237673 A1* | 8/2017 | Law | H04W 4/023 |
| | | | 370/338 |
| 2017/0337753 A1* | 11/2017 | Joodaki | G06V 20/63 |
| 2018/0167844 A1* | 6/2018 | Mattela | H04W 4/026 |
| 2018/0197409 A1* | 7/2018 | Youm | G08B 25/08 |
| 2020/0015111 A1* | 1/2020 | Martinez | H04L 25/03057 |
| 2020/0221544 A1* | 7/2020 | Nishizaki | H04W 4/40 |
| 2020/0344643 A1* | 10/2020 | Zhou | H04W 76/14 |
| 2022/0169175 A1* | 6/2022 | Choi | H04L 1/20 |

\* cited by examiner

DEVICE AND METHOD FOR PROVIDING NOTIFICATION OF OCCURRENCE OF VEHICLE ACCIDENT

CROSS-REFERENCE TO RELATED APPLICATION

This application claims under 35 U.S.C. § 119(a) the benefit of Korean Patent Application No. 10-2020-0164975, filed in the Korean Intellectual Property Office on Nov. 30, 2020, the entire contents of which are incorporated herein by reference.

BACKGROUND

(a) Technical Field

The present disclosure relates to a device and method for providing a notification of an occurrence of a vehicle accident or emergency, more particularly, to the device and method for providing the notification of the vehicle accident or emergency when an airbag is deployed.

(b) Description of the Related Art

Among existing technologies, one example is an emergency rescue request and another example is a notification that a vehicle has moved into a shadow area. Further, a device for providing an automatic notification that an airbag has been deployed may be provided in a commercial vehicle. In addition, when a connection to a call center for the accident notification has failed, the connection to the call center is reattempted for a predetermined number of times. However, even when the connection to the call center is reattempted in various schemes, when the number of reattempts is exceeded, the emergency rescue request eventually fails. In particular, when a connection with a server has failed because of a wireless network environment, the emergency rescue request may fail.

There is a need for an additional method for providing a notification of an occurrence of an accident (i.e., to request assistance or rescue) in an emergency situation in which a wireless network environment may be down or is otherwise not operating correctly as described above, and in which the probability of success of a connection is increased.

In addition, there is also a technology for a vehicle location sharing service. However, because existing systems do not link the vehicle location sharing service with the accident occurrence notification, such a technology would be desirable.

SUMMARY

An aspect of the present disclosure provides a device and method that provide a notification of an occurrence of a vehicle accident or emergency when an airbag is deployed.

Another aspect of the present disclosure provides a device and method for providing a notification of an occurrence of a vehicle accident or emergency that, when transmission of a notification including information on the occurrence of the accident has failed because of failure of a wireless network communication, reattempt to connect a wireless communication the appropriate number of times to increase a success rate.

Another aspect of the present disclosure provides a device and method for providing a notification of an occurrence of a vehicle accident or emergency that attempt to notify the occurrence of the accident in various methods by linking the accident occurrence notification with a vehicle location sharing service.

Another aspect of the present disclosure provides a device and a method for providing a notification of an occurrence of a vehicle accident or emergency that may effectively cope with the accident by providing a notification of the occurrence of the accident and transmitting an accident location to different people based on the accident location.

Another aspect of the present disclosure provides a device and a method for providing a notification of an occurrence of a vehicle accident or emergency that may quickly and conveniently notify acquaintances of accident news by sharing a location and transmitting an accident occurrence notification to emergency contacts on a contact list registered in an account of a driver.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for providing a notification of an occurrence of a vehicle accident includes a communication device equipped in the vehicle, wherein the communication device communicates with a server through at least one communication medium, and a controller that transmits a notification including information on the occurrence of the accident when an airbag of the vehicle is deployed to the server through the communication device, and retransmits the notification through the communication device based on an intensity of a signal received from the server when the transmission of the notification has failed.

In one implementation, the communication device may acquire a signal to noise ratio (SNR) of the signal received from the server for the communication medium, and wherein the controller may retransmit the notification the first number of reattempts through the communication medium when the signal to noise ratio exceeds a reference value, and retransmit the notification the second number of reattempts through the communication medium when the signal to noise ratio does not exceed the reference value.

In one implementation, the controller may transmit the notification through communication medium of a next priority when transmission of the notification and retransmission of the notification through communication medium of a specific priority have failed, and retransmit the notification through the communication medium of the next priority when the transmission of the notification through the communication medium of the next priority has failed.

In one implementation, the communication medium may include at least one of a hyper text transfer protocol (HTTP) connection, a short message service (SMS) connection, or a call connection.

In one implementation, the controller may continuously repeat transmission of the notification through a call connection until the transmission of the notification is successful when the signal to noise ratio exceeds the reference value and the connection is interrupted during the call while transmitting or retransmitting the notification through the call connection.

In one implementation, the controller may connect a call through a communication terminal to an organization capable of requesting a rescue when the transmission and the retransmission of the notification have failed, and the vehicle is connected to the communication terminal through communication.

In one implementation, the controller may provide a guide notification including at least one of a content indicating that the vehicle has entered a shadow area or a content of guiding a rescue request through a communication terminal to a user through the vehicle when the vehicle has entered a section determined as the shadow area.

In one implementation, the controller may attempt to transmit the notification through the communication device when the vehicle is out of the section determined as the shadow area, and a signal to noise ratio of a signal received from the server for the communication medium exceeds the reference value.

According to another aspect of the present disclosure, a device for providing a notification of an occurrence of a vehicle accident includes a communication device equipped in the vehicle providing a location sharing service, wherein the communication device communicates with a communication terminal capable of sharing a location of the vehicle, and a controller transmits a notification including information on the occurrence of the accident to a communication terminal sharing the location of the vehicle through the communication device when an airbag of the vehicle is deployed and the location sharing service is being performed.

In one implementation, the controller may perform the location sharing service with a specific communication terminal based on an accident occurrence area, an accident occurrence time, and a traffic volume, and transmit the notification including the information on the occurrence of the accident to the specific communication terminal when the airbag of the vehicle is deployed and the location sharing service is not being performed.

In one implementation, the controller may perform the location sharing service with the specific communication terminal including communication terminals registered as emergency contacts of a driver of the vehicle through a personalized service, and transmit the notification including the information on the occurrence of the accident to the specific communication terminal when the vehicle provides the personalized service.

In one implementation, the controller may perform the location sharing service with a specific communication terminal including communication terminals corresponding to the accident occurrence area among the communication terminals registered as the emergency contacts, and transmit the notification including the information on the occurrence of the accident to the specific communication terminal when the communication terminals registered as the emergency contacts are registered in a manner of being classified based on the accident occurrence area.

According to another aspect of the present disclosure, a method for providing a notification of an occurrence of a vehicle accident includes acquiring an intensity of a signal received from a server for at least one communication medium, transmitting a notification including information on the occurrence of the accident to the server when an airbag of the vehicle is deployed, and retransmitting the notification based on the intensity of the received signal when the transmission of the notification has failed.

In one implementation, the acquiring of the intensity of the signal received from the server for the at least one communication medium may include acquiring a signal to noise ratio of the signal received from the server for the communication medium, and the retransmitting of the notification based on the intensity of the received signal when the transmission of the notification has failed may include retransmitting the notification the first number of reattempts through the communication medium when the signal to noise ratio exceeds a reference value, and retransmitting the notification the second number of reattempts through the communication medium when the signal to noise ratio does not exceed the reference value.

In one implementation, the communication medium may include at least one of a HTTP connection, a SMS connection, or a call connection, and the retransmitting of the notification based on the intensity of the received signal when the transmission of the notification has failed may further include continuously repeating transmission of the notification through the call connection until the transmission of the notification is successful when the signal to noise ratio exceeds the reference value and the connection is interrupted during the call while transmitting or retransmitting the notification through the call connection.

In one implementation, the method may further include connecting a call through a communication terminal to an organization capable of requesting a rescue when the transmission and the retransmission of the notification have failed, and the vehicle is connected to the communication terminal through communication.

In one implementation, the method may further include providing a guide notification including at least one of a content indicating that the vehicle has entered a shadow area or a content of guiding a rescue request through a communication terminal to a user through the vehicle when the vehicle has entered a section determined as the shadow area.

According to another aspect of the present disclosure, a method for providing a notification of an occurrence of a vehicle accident includes determining whether a location sharing service of the vehicle is being performed, and transmitting a notification including information on the occurrence of the accident to a communication terminal sharing the location of the vehicle when an airbag of the vehicle is deployed and the location sharing service is being performed.

In one implementation, the method may further include performing the location sharing service with a specific communication terminal based on an accident occurrence area, an accident occurrence time, and a traffic volume, and transmitting the notification including the information on the occurrence of the accident to the specific communication terminal when the airbag of the vehicle is deployed and the location sharing service is not being performed.

In one implementation, the performing of the location sharing service with the specific communication terminal, and the transmitting of the notification including the information on the occurrence of the accident to the specific communication terminal may include performing the location sharing service with the specific communication terminal including communication terminals registered as emergency contacts of a driver of the vehicle through a personalized service, and transmitting the notification including the information on the occurrence of the accident to the specific communication terminal when the vehicle provides the personalized service.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
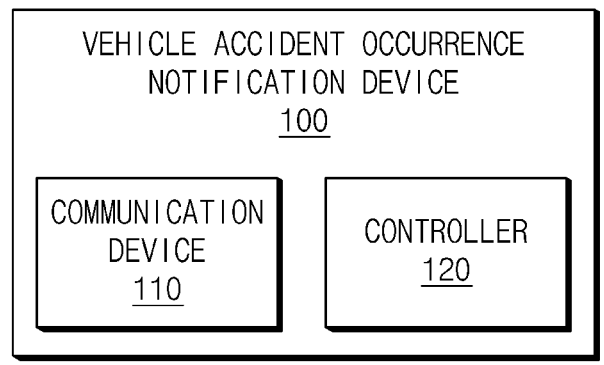
FIG. 1 is a block diagram illustrating a vehicle accident occurrence notification device according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 8.

FIG. 1 is a block diagram illustrating a vehicle accident occurrence notification device according to an embodiment of the present disclosure.

Referring to FIG. 1, a vehicle accident occurrence notification device 100 may be implemented by including a communication device 110 and a controller 120.

The vehicle accident occurrence notification device 100 may be implemented integrally with a vehicle, may be implemented in a form of being installed in/attached to the vehicle as a component separate from the vehicle, or some of components thereof may be implemented integrally with the vehicle and the remaining components thereof may be implemented in a form of being installed in/attached to the vehicle as components separate from the vehicle.

For example, the vehicle equipped with the vehicle accident occurrence notification device 100 may have an airbag and a system for transmitting information including an occurrence of an accident when the airbag is deployed.

The communication device 110 may be equipped in the vehicle, and communicate with a server through a communication medium.

For example, the communication device 110 may transmit situation information and the like to the outside by communicating with the external server. The communication device 110 may transmit and receive data using various communication schemes. For example, the communication device 110 may be connected through a Wi-Fi direct communication. According to an embodiment, schemes such as a Wi-Fi, a wireless broadband (Wibro), a world interoperability for microwave access (Wimax), a Bluetooth, a radio frequency identification (RFID), an infrared communication (IrDA, infrared data association), a Zigbee, an ultra-wide band (UWB) communication, a near field communication (NFC), and the like may be used.

For example, the communication device 110 may communicate with the server through a communication medium including at least one of a hyper text transfer protocol (HTTP) connection, a short message service (SMS) connection, or a call connection.

The communication device 110 may acquire, for the communication medium, a signal to noise ratio (SNR) of a signal received from the server.

For example, the communication device 110 may detect a magnitude of the signal and a magnitude of a noise received from the server, and the signal to noise ratio may be calculated through the magnitude of the signal and the magnitude of the noise acquired from the communication device 110.

The communication device 110 may be directly or indirectly connected to the controller 120 through a wireless or wired communication.

For example, the communication device 110 may transmit information on the signal to noise ratio to the controller 120.

For example, the communication device 110 may receive a command from the controller 120 and transmit the command to the server, and in particular, may transmit a notification including the information on the occurrence of the accident.

When the airbag of the vehicle is deployed, the controller 120 may transmit the notification including the information on the occurrence of the accident to the server through the communication device 110, and retransmit the notification through the communication device 110 based on an intensity of the signal received from the server when the transmission of the notification has failed.

The controller 120 may perform overall control such that each component may normally perform a function thereof. Such controller 120 may be implemented in the form of hardware, software, or a combination of hardware and software. Preferably, the controller 120 may be implemented as a microprocessor, but may not be limited thereto. In addition, the controller 120 may perform various data processing, calculations, and the like to be described later.

The controller 120 may be directly or indirectly connected to the communication device 110 through the wireless or wired communication.

For example, the controller 120 may receive the information on the signal to noise ratio from the communication device 110.

For example, the controller 120 may transmit the command to the communication device 110 to transmit data to the server through the communication device 110.

The controller 120 may be directly or indirectly connected to the airbag or an airbag control unit (ACU) of the vehicle through the wireless or wired communication.

For example, when the airbag is deployed, the controller 120 may receive information indicating that the airbag has been deployed through the airbag or the ACU of the vehicle.

Figure 2:
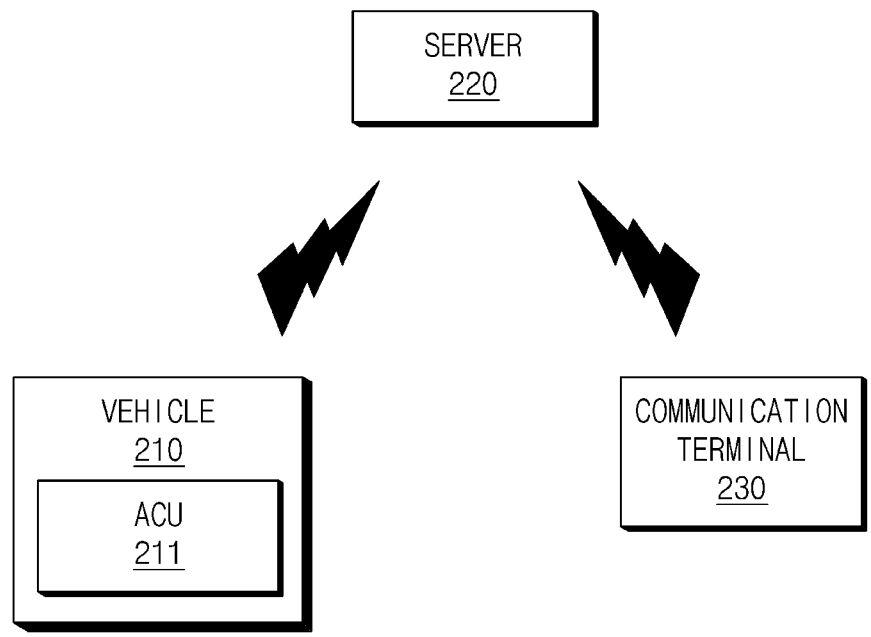
FIG. 2 is a diagram illustrating a configuration of a system including a vehicle accident occurrence notification device according to an embodiment of the present disclosure.

FIG. 2 is a diagram illustrating a configuration of a system including a vehicle accident occurrence notification device according to an embodiment of the present disclosure.

A vehicle accident occurrence notification system may include a vehicle 210, a server 220, and a communication terminal 230.

The vehicle 210 may include a connected car terminal.

The vehicle 210 may be implemented by including an audio, video, navigation, telematics (AVNT) terminal.

The vehicle 210 may be implemented by being connected to an in-vehicle accident occurrence sensing device, and receive information on an occurrence of an accident in the vehicle from the in-vehicle accident occurrence sensing device.

For example, the in-vehicle accident occurrence sensing device may include at least one of an airbag module or an ACU 211.

For example, the vehicle 210 may be implemented by including the ACU 211.

For example, the vehicle 210 may acquire information indicating that an airbag of the vehicle 210 has been deployed through the ACU 211.

The ACU 211 may control the airbag of the vehicle, receive information on an impact sensed by a collision sensor equipped in the vehicle to determine whether to deploy the airbag, and output a command to deploy the airbag to deploy the airbag.

For example, the ACU 211 may transmit information on whether the airbag is deployed to the vehicle accident occurrence notification device 100.

The vehicle 210 may transmit and receive information to and from the server 220 through the wireless communication.

For example, the vehicle 210 may communicate with the server 220 through the communication device 110 of the vehicle accident occurrence notification device 100.

The server 220 may communicate with a plurality of vehicles and communication terminals, and may manage a connected car service overall.

For example, the server 220 may include a server of a connected car service center.

The communication terminal 230 may transmit and receive information to and from the server 220 through the wireless communication.

For example, the communication terminal 230 may include a smart phone, and manage the vehicle 210 through the communication with the server 220.

For example, the communication terminal 230 may be storing information on emergency contacts of a personalized account, and may directly or indirectly transmit the information on the emergency contacts to at least one of the server 220 or the vehicle 210 through the communication.

A basic operation of a function of automatically providing a notification of the occurrence of the accident when the airbag is deployed of the vehicle accident occurrence notification system will be described as follows.

When the airbag of the vehicle 210 is deployed, the ACU 211 may transmit the information indicating that the airbag has been deployed to the vehicle 210.

In addition, the vehicle 210 may transmit the notification including the information on the occurrence of the accident to the server 220 through a HTTP communication or a packet communication.

For example, the vehicle 210 may transmit the notification including the information on the occurrence of the accident to the server 220 through the HTTP communication or the packet communication of the communication device 110.

Thereafter, the vehicle 210 may receive a response signal (ACK, Acknowledgement) from the server 220.

For example, the vehicle 210 may receive the response signal from the server 220 through the communication device 110. In this process, the information on the signal to noise ratio of the signal received from the server may be acquired.

When the transmission of the notification including the information on the occurrence of the accident through the HTTP communication or the packet communication has failed, the vehicle 210 may transmit the notification including the information on the occurrence of the accident through the SMS communication or a circuit communication.

When the transmission of the notification including the information on the occurrence of the accident through the SMS communication or the circuit communication has failed, the vehicle 210 may transmit the notification including the information on the occurrence of the accident through the call connection.

For example, the vehicle 210 may transmit a content including the information on the occurrence of the accident through the call connection to an emergency rescue center.

For example, when the call connection has failed, the vehicle 210 may continuously reattempt to connect the call for 3 minutes.

In this connection, the time of 3 minutes is a value arbitrarily determined for illustration purposes. The time may actually be set to be a different value or may be set to have a different value based on a condition.

For example, when the connection is interrupted during the call connection, the emergency rescue center may attempt to connect the call to the vehicle.

Figure 3:
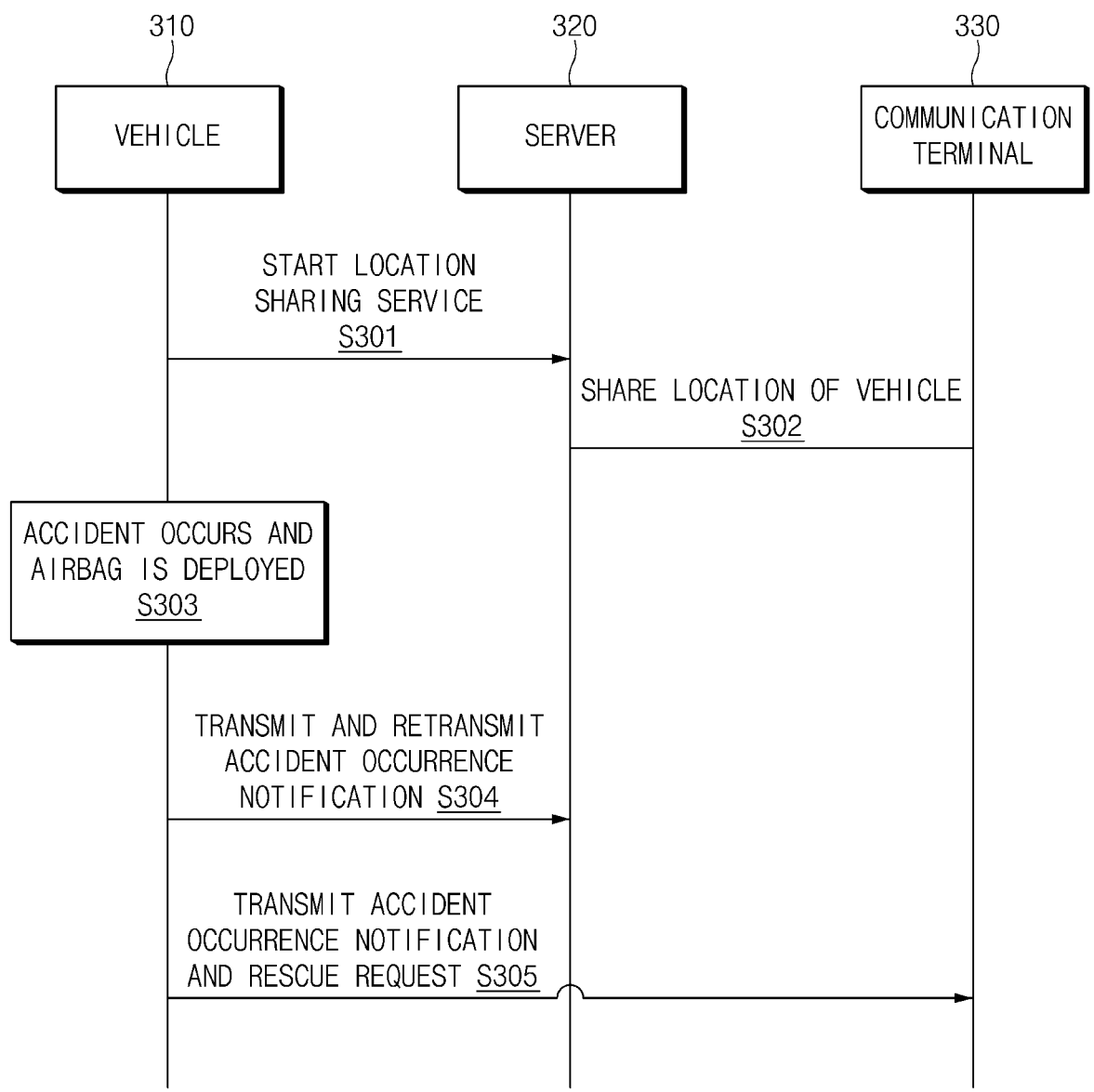
FIG. 3 is a diagram illustrating operations of a vehicle accident occurrence notification system according to an embodiment of the present disclosure.

FIG. 3 is a diagram illustrating operations of a vehicle accident occurrence notification system according to an embodiment of the present disclosure.

FIG. 3 is a flowchart illustrating an example in a situation in which deployment of an airbag of a vehicle providing a location sharing service has occurred.

First, a vehicle 310 may start a location sharing service through a communication with a server 320 (S301).

For example, the vehicle 310 may acquire a location of the vehicle 310 through a location determination device such as a global positioning system (GPS), and transmit the location of the vehicle 310 to the server 320 through the wireless communication.

Thereafter, the server 320 may share the location of the vehicle 310 through a communication with a communication terminal 330 (S302).

For example, the server 320 may transmit information on the location of the vehicle 310 to the communication terminal 330 set as a target of the location sharing service in advance.

For example, the communication terminal 330 may include at least one of a smart phone set as a location sharing target of the vehicle 310 or a vehicle set as the location sharing target of the vehicle 310.

Thereafter, the vehicle 310 may be in a situation in which the airbag is deployed because of the occurrence of the accident (S303).

For example, when the accident occurs and the impact occurs in the vehicle 310, the ACU of the vehicle may deploy the airbag and the vehicle 310 may identify the information indicating that the airbag has been deployed through the ACU.

Thereafter, the vehicle 310 may transmit and retransmit the notification including the information on the occurrence of the accident to the server 320 (S304).

For example, the vehicle 310 may identify the information on the occurrence of the accident through the information indicating that the airbag has been deployed through the ACU.

For example, when the airbag is deployed, the vehicle 310 may transmit the notification including the information on the occurrence of the accident to the server 320.

For example, when a response signal is not received from the server 320 after transmitting the notification including the information on the occurrence of the accident to the server 320, the vehicle 310 may retransmit the notification including the information on the occurrence of the accident to the server 320.

A process of S304 will be described in detail in FIGS. 4A, 4B and 4C.

Thereafter, the vehicle 310 may transmit the notification including the information on the occurrence of the accident to the communication terminal 330 (S305).

For example, the vehicle 310 may transmit the notification including the information on the occurrence of the accident to the communication terminal 330 in which the location sharing service is being performed.

Figure 4A:
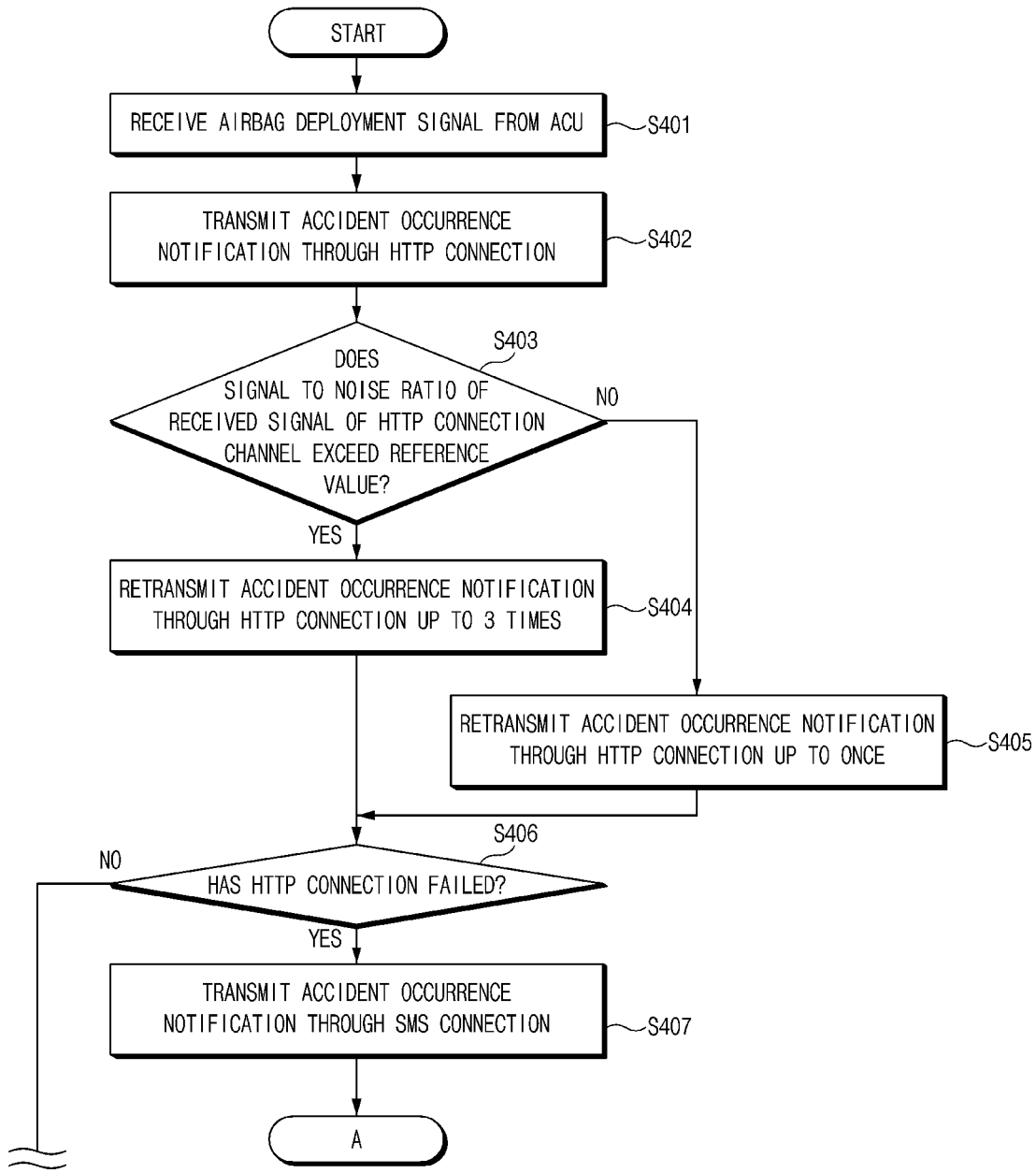
FIGS. 4A, 4B and 4C are diagrams illustrating a process of retransmitting an accident occurrence notification by a vehicle accident occurrence notification device according to an embodiment of the present disclosure.
Figure 4B:
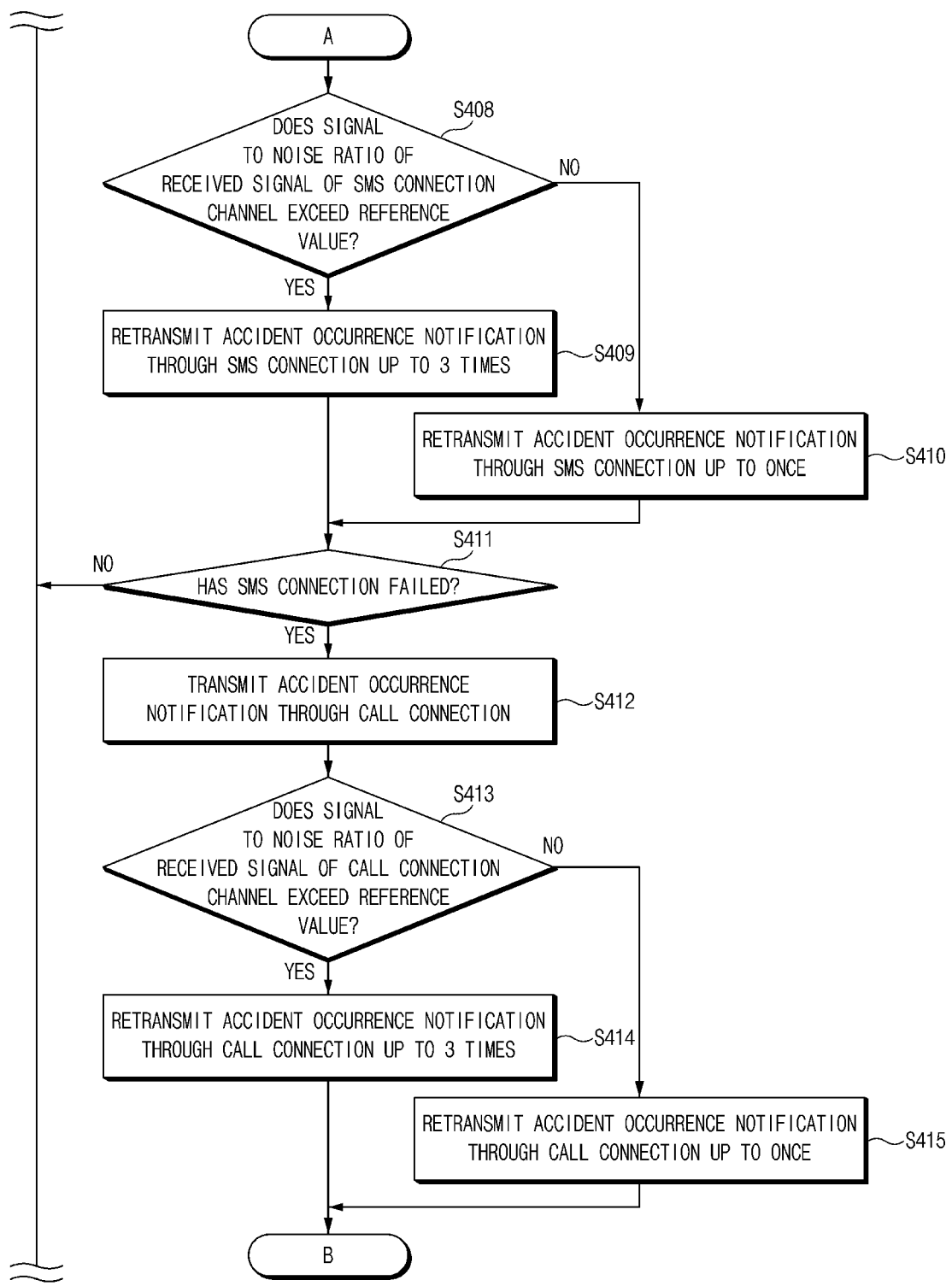
Figure 4C:
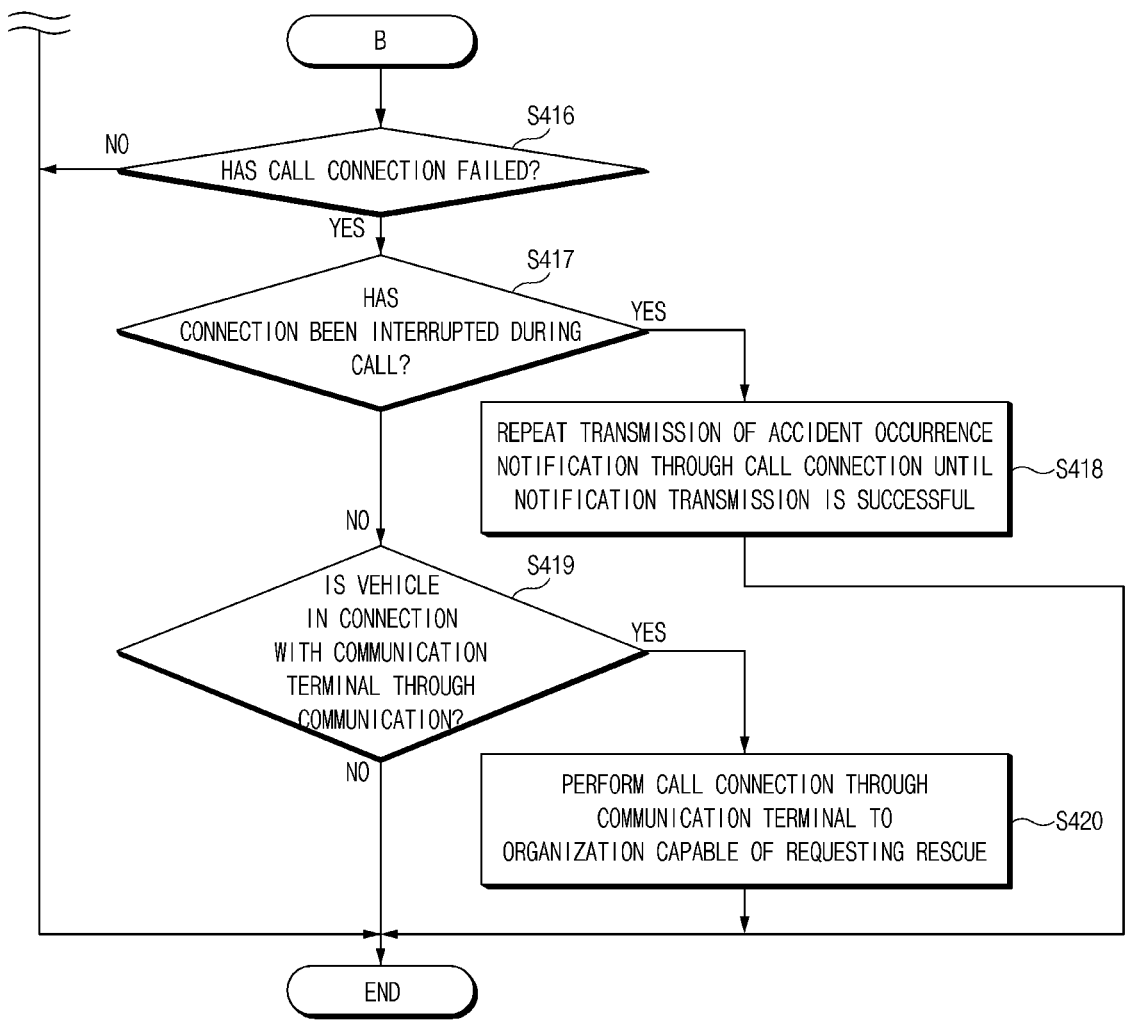

FIGS. 4A, 4B and 4C are diagrams illustrating a process of retransmitting an accident occurrence notification by a vehicle accident occurrence notification device according to an embodiment of the present disclosure.

The vehicle accident occurrence notification device 100 may receive an airbag deployment signal from the ACU (S401).

After receiving the airbag deployment signal from the ACU, the vehicle accident occurrence notification device 100 may transmit the notification including the information on the occurrence of the accident to the server through the HTTP connection (S402).

For example, the vehicle accident occurrence notification device 100 may transmit the notification including the information on the occurrence of the accident to the server through the HTTP connection or the packet communication.

For example, the notification including the information on the occurrence of the accident may include information on an accident occurrence location.

After transmitting the notification including the information on the occurrence of the accident to the server through the HTTP connection, the vehicle accident occurrence notification device 100 may determine whether a signal to noise ratio of a received signal of a HTTP connection channel exceeds a reference value (S403).

For example, the vehicle accident occurrence notification device 100 may acquire a signal to noise ratio of a received signal of a channel corresponding to the HTTP connection or the packet communication through the communication device 110, and determine whether the acquired signal to noise ratio exceeds a reference value for the HTTP connection or the packet communication stored in advance in a memory.

For example, the vehicle accident occurrence notification device 100 may determine the number of attempts for retransmitting the notification based on whether the signal to noise ratio of the channel corresponding to the HTTP connection or the packet communication exceeds the reference value.

For example, the vehicle accident occurrence notification device 100 may retransmit the notification the first number of reattempts through the HTTP connection or the packet communication when the signal to noise ratio of the channel corresponding to the HTTP connection or the packet communication exceeds the reference value, and retransmit the notification the second number of reattempts when the signal to noise ratio of the channel corresponding to the HTTP connection or the packet communication does not exceed the reference value.

When the signal to noise ratio of the received signal of the HTTP connection channel exceeds the reference value, the vehicle accident occurrence notification device 100 may retransmit the notification including the information on the occurrence of the accident to the server up to 3 times through the HTTP connection (S404).

When the signal to noise ratio of the received signal of the HTTP connection channel does not exceed the reference value, the vehicle accident occurrence notification device 100 may retransmit the notification including the information on the occurrence of the accident to the server up to once through the HTTP connection (S405).

After retransmitting the notification including the information on the occurrence of the accident to the server through the HTTP connection, the vehicle accident occurrence notification device 100 may determine whether the HTTP connection has failed (S406).

For example, the vehicle accident occurrence notification device 100 may determine whether the HTTP connection has failed through the response signal received from the server.

When the HTTP connection has failed, the vehicle accident occurrence notification device 100 may transmit the notification including the information on the occurrence of the accident to the server through the SMS connection (S407).

For example, the vehicle accident occurrence notification device 100 may transmit the notification including the information on the occurrence of the accident to the server through the SMS connection or the circuit communication.

After transmitting the notification including the information on the occurrence of the accident to the server through the SMS connection, the vehicle accident occurrence notification device 100 may determine whether a signal to noise ratio of a received signal of a SMS connection channel exceeds a reference value (S408).

For example, the vehicle accident occurrence notification device 100 may acquire a signal to noise ratio of a received signal of a channel corresponding to the SMS connection or the circuit communication through the communication device 110, and determine whether the acquired signal to noise ratio exceeds a reference value for the SMS connection or the circuit communication stored in advance in the memory.

For example, the vehicle accident occurrence notification device 100 may determine the number of attempts for retransmitting the notification based on whether the signal to noise ratio of the channel corresponding to the SMS connection or the circuit communication exceeds the reference value.

For example, the vehicle accident occurrence notification device 100 may retransmit the notification the first number of reattempts through the SMS connection or the circuit communication when the signal to noise ratio of the channel corresponding to the SMS connection or the circuit communication exceeds the reference value, and retransmit the notification the second number of reattempts through the SMS connection or the circuit communication when the signal to noise ratio of the channel corresponding to the SMS connection or the circuit communication does not exceed the reference value.

When the signal to noise ratio of the received signal of the SMS connection channel exceeds the reference value, the vehicle accident occurrence notification device 100 may retransmit the notification including the information on the occurrence of the accident to the server up to 3 times through the SMS connection (S409).

When the signal to noise ratio of the received signal of the SMS connection channel does not exceed the reference value, the vehicle accident occurrence notification device 100 may retransmit the notification including the information on the occurrence of the accident to the server up to once through the SMS connection (S410).

After retransmitting the notification including the information on the occurrence of the accident to the server through the SMS connection, the vehicle accident occurrence notification device 100 may determine whether the SMS connection has failed (S411).

For example, the vehicle accident occurrence notification device 100 may determine whether the SMS connection has failed through the response signal received from the server.

When the SMS connection has failed, the vehicle accident occurrence notification device 100 may transmit the notification including the information on the occurrence of the accident through the call connection to the server (S412).

After transmitting the notification including the information on the occurrence of the accident through the call connection to the server, the vehicle accident occurrence notification device 100 may determine whether a signal to noise ratio of a received signal of a call connection channel exceeds a reference value (S413).

For example, the vehicle accident occurrence notification device 100 may acquire a signal to noise ratio of a received signal of a channel corresponding to the call connection through the communication device 110, and determine whether the acquired signal to noise ratio exceeds a reference value for the call connection stored in advance in the memory.

For example, the vehicle accident occurrence notification device 100 may determine the number of attempts for retransmitting the notification based on whether the signal to noise ratio of the channel corresponding to the call connection exceeds the reference value.

For example, the vehicle accident occurrence notification device 100 may retransmit the notification the first number of reattempts through the call connection when the signal to noise ratio of the channel corresponding to the call connection exceeds the reference value, and retransmit the notification the second number of reattempts through the call connection when the signal to noise ratio of the channel corresponding to the call connection does not exceed the reference value.

When the signal to noise ratio of the received signal of the call connection channel exceeds the reference value, the vehicle accident occurrence notification device 100 may retransmit the notification including the information on the occurrence of the accident to the server up to 3 times through the call connection (S414).

When the signal to noise ratio of the received signal of the call connection channel does not exceed the reference value, the vehicle accident occurrence notification device 100 may retransmit the notification including the information on the occurrence of the accident to the server up to once through the call connection (S415).

For example, the vehicle accident occurrence notification device 100 retransmits the notification the first number of reattempts as 3 and the second number of reattempts as 1, where the numbers of reattempts are arbitrarily determined for purposes of illustration, and are actually able to be set to different values.

For example, the first number of reattempts and the second number of reattempts may be set to different values based on the communication medium such as the HTTP connection, the SMS connection, or the call connection.

For example, the reference values for comparing the signal to noise ratio may be set to different values based on the communication medium such as the HTTP connection, the SMS connection, or the call connection.

In addition, when the signal to noise ratio of the received signal exceeds the reference value, it may be determined that an intensity of the received signal is good. Accordingly, the vehicle accident occurrence notification device 100 may set the first number of reattempts to be larger than the second number of reattempts, and may reattempt to connect the call the greater number of times to increase a probability of a successful connection when the intensity of the received signal is good.

For example, when transmission of the notification and retransmission of the notification through communication medium of a specific priority have failed, the vehicle accident occurrence notification device 100 may transmit the notification through communication medium of a next priority, and retransmit the notification through communication medium of the next priority when the transmission of the notification through the communication medium of the next priority has failed.

According to the illustrated example, the transmission of the notification is performed in an order of the HTTP connection, the SMS connection, and the call connection, but the order may be changed according to an embodiment.

The vehicle accident occurrence notification device 100 may determine whether the call connection has failed after retransmitting the notification including the information on the occurrence of the accident to the server through the call connection (S416).

For example, the vehicle accident occurrence notification device 100 may determine whether the call connection has failed through the response signal received from the server.

The vehicle accident occurrence notification device 100 may determine whether the connection has been interrupted during the call when the call connection has failed (S417).

When the connection has been interrupted during the call, the vehicle accident occurrence notification device 100 may repeat the transmission of the notification including the information on the occurrence of the accident to the server through the call connection until the notification transmission is successful (S418).

For example, when the connection has been interrupted during the call, the vehicle accident occurrence notification device 100 may determine whether the signal to noise ratio of the call connection channel exceeds the reference value, and repeat the transmission of the notification including the information on the occurrence of the accident to the server through the call connection until the notification transmission is successful when the signal to noise ratio of the call connection channel exceeds the reference value and a state of the communication is at a level at which the call is possible.

When the connection has not been interrupted during the call, the vehicle accident occurrence notification device 100 may determine whether the vehicle is in connection with the communication terminal through the communication (S419).

For example, the vehicle accident occurrence notification device 100 may determine whether the AVNT of the vehicle is in direct connection with the communication terminal through at least one of a Bluetooth, an Android Auto, or a CarPlay.

When the vehicle is in connection with the communication terminal through the communication, the vehicle accident occurrence notification device 100 may perform the call connection through the communication terminal to an organization capable of requesting a rescue (S420).

For example, the vehicle accident occurrence notification device 100 may perform the call connection to the organization capable of requesting the rescue including the emergency rescue center or a 119 safety report center through the communication terminal in connection with the vehicle.

For example, the vehicle accident occurrence notification device 100 may transmit information on a phone number of the organization capable of requesting the rescue from the vehicle to the communication terminal to perform the call connection to the organization capable of requesting the rescue through the communication terminal.

Figure 5:
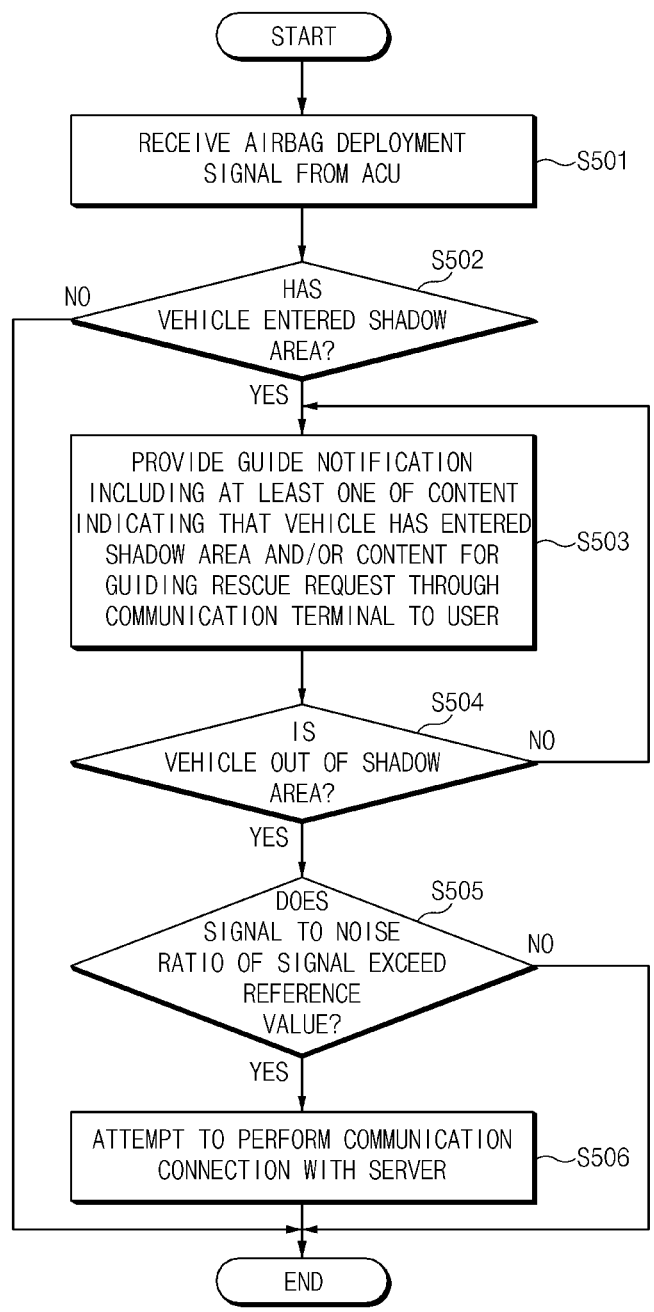
FIG. 5 is a flowchart illustrating a process in which a vehicle accident occurrence notification device according to an embodiment of the present disclosure operates when a vehicle enters a shadow area.

FIG. 5 is a flowchart illustrating a process in which a vehicle accident occurrence notification device according to an embodiment of the present disclosure operates when a vehicle enters a shadow area.

The vehicle accident occurrence notification device 100 may receive the airbag deployment signal from the ACU (S501).

After receiving the airbag deployment signal from the ACU, the vehicle accident occurrence notification device 100 may determine whether the vehicle has entered a shadow area (S502).

For example, when a communication with the server through a telematics service including at least one of a Bluelink, a UVO, or a Genesis connected service is not performed smoothly, the vehicle accident occurrence notification device 100 may determine that the vehicle has entered the shadow area.

For example, when the communication with the server is not smoothly performed for at least one of the channels respectively corresponding to the HTTP connection, the SMS connection, and the call connection, the vehicle accident occurrence notification device 100 may determine that the vehicle has entered the shadow area.

When the vehicle has entered the shadow area, the vehicle accident occurrence notification device 100 may provide a guide notification including at least one of a content indicating that the vehicle has entered the shadow area or a content for guiding a rescue request through the communication terminal to the user (S503).

By receiving the guide notification including at least one of the content indicating that the vehicle has entered the shadow area or the content for guiding the rescue request through the communication terminal, a driver may anticipate that the accident occurrence notification will not be transmitted automatically in an accident situation, and directly notify the outside of the occurrence of the accident and request the rescue through a communication terminal of the driver.

After providing the guide notification including at least one of the content indicating that the vehicle has entered the shadow area or the content for guiding the rescue request to the user through the communication terminal, the vehicle accident occurrence notification device 100 may determine whether the vehicle is out of the shadow area (S504).

For example, when the communication with the server through the telematics service including at least one of the Bluelink, the UVO, or the Genesis connected service is performed smoothly, the vehicle accident occurrence notification device 100 may determine that the vehicle is out of the shadow area.

For example, when the communication with the server is smoothly performed for at least one of the channels respectively corresponding to the HTTP connection, the SMS connection, and the call connection, the vehicle accident occurrence notification device 100 may determine that the vehicle is out of the shadow area.

When the vehicle is out of the shadow area, the vehicle accident occurrence notification device 100 may determine whether the signal to noise ratio of the signal received from the server exceeds the reference value (S505).

For example, the vehicle accident occurrence notification device 100 may acquire the signal to noise ratio of the received signal of the channel through the communication device 110, and determine whether the acquired signal to noise ratio exceeds the reference value stored in advance in the memory.

When the signal to noise ratio of the signal received from the server exceeds the reference value, the vehicle accident occurrence notification device 100 may attempt to perform communication connection with the server (S506).

For example, the vehicle accident occurrence notification device 100 may perform the process of automatically transmitting the notification including the information on the occurrence of the accident to the server again through the communication connection with the server.

For example, the vehicle accident occurrence notification device 100 may provide a notification indicating that the vehicle is out of the shadow area to the driver.

Figure 6A:
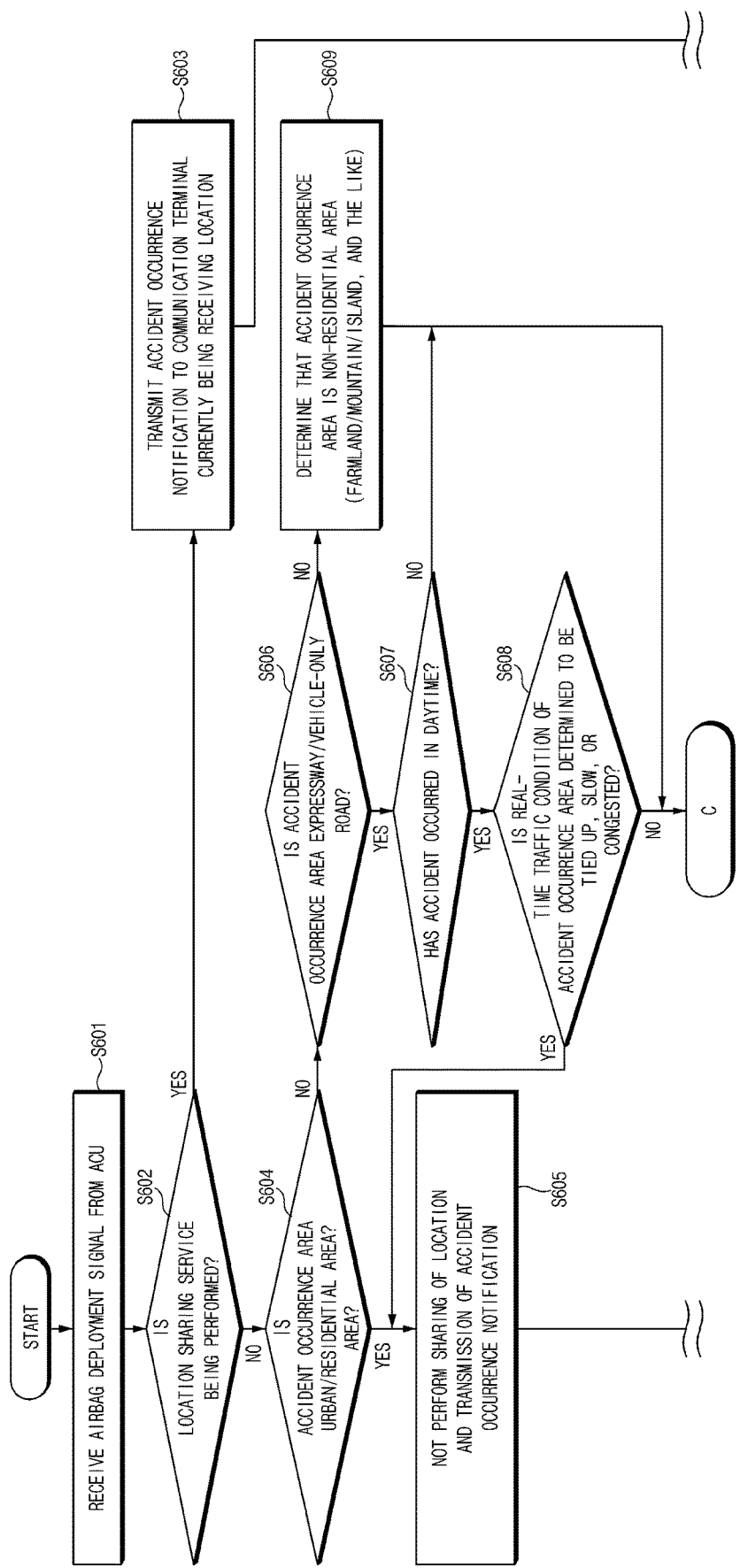
FIGS. 6A and 6B are flowcharts illustrating a process operating when a vehicle accident occurrence notification device according to an embodiment of the present disclosure provides a location sharing service.
Figure 6B:
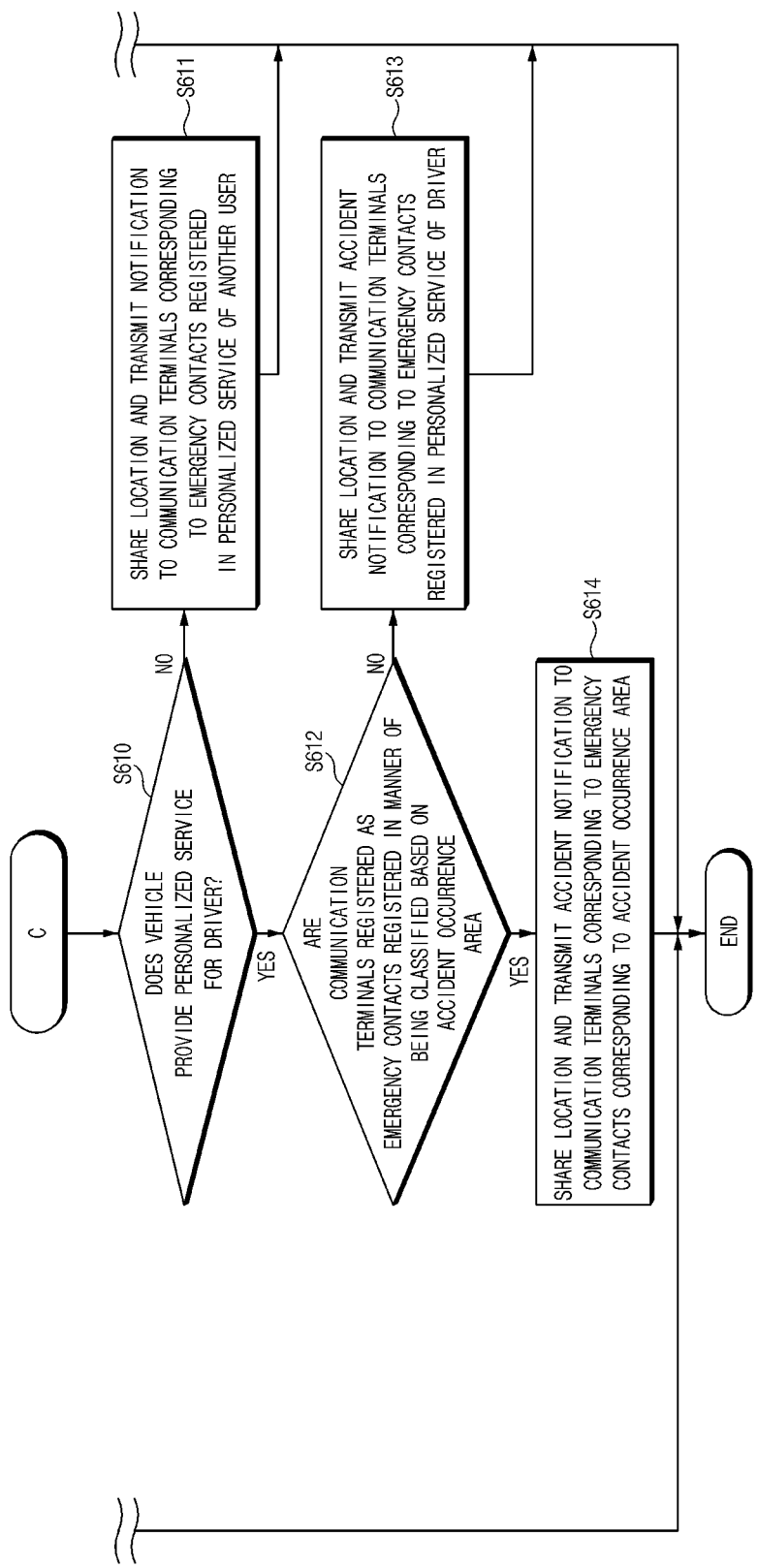

FIGS. 6A and 6B are flowcharts illustrating a process operating when a vehicle accident occurrence notification device according to an embodiment of the present disclosure provides a location sharing service.

The vehicle accident occurrence notification device 100 may receive the airbag deployment signal from the ACU (S601).

After receiving the airbag deployment signal from the ACU, the vehicle accident occurrence notification device 100 may determine whether the location sharing service of the vehicle is being performed (S602).

For example, the vehicle accident occurrence notification device 100 may determine whether a location of the vehicle is being shared by 1:1 or 1:N, and identify information on communication terminals sharing the location of the vehicle when the vehicle location is being shared.

Although not shown, the vehicle accident occurrence notification device 100 may first determine whether the location sharing service of the vehicle is being performed, and then receive the airbag deployment signal from the ACU. Alternatively, the vehicle accident occurrence notification device 100 may receive the airbag deployment signal from the ACU while determining whether the location sharing service of the vehicle is being performed at the same time.

When the location sharing service of the vehicle is being performed, the vehicle accident occurrence notification device 100 may transmit the notification including the information on the occurrence of the accident to the communication terminal currently sharing the location of the vehicle (S603).

The notification including the information on the occurrence of the accident may include an accident occurrence time, the location, a destination, information on the number of occupants, a content of requesting the rescue, and the like.

For example, when the airbag of the vehicle is deployed and the location sharing service is not being performed, the vehicle accident occurrence notification device 100 may perform the location sharing service with a specific communication terminal based on an area where the accident has occurred, the time when the accident has occurred, and a traffic volume, and transmit the notification including the information on the occurrence of the accident to the specific communication terminal.

When the location sharing service of the vehicle is not being performed, the vehicle accident occurrence notification device 100 may determine whether the area where the accident of the vehicle has occurred is an urban/residential area (S604).

In this connection, the urban/residential area is only an example of an area where it is possible to quickly recognize the accident in the vicinity and offer help. In practice, the urban/residential area may be set to another area determined where it is possible to quickly recognize the accident in the vicinity and offer the help.

When the area where the accident of the vehicle has occurred is the urban/residential area, the vehicle accident occurrence notification device 100 may not perform the sharing of the location of the vehicle and the transmission of the notification including the information on the occurrence of the accident (S605).

For example, when the area where the accident of the vehicle has occurred is the urban/residential area, the vehicle accident occurrence notification device 100 may identify that the accident may be quickly recognized in the vicinity at the nearby area and the help may be offered from the nearby area, thereby determining that it is not necessary to notify the occurrence of the accident and request the help to the outside, and not performing the sharing of the location of the vehicle and the transmission of the notification including the information on the occurrence of the accident.

When the area where the accident of the vehicle has occurred is not the urban/residential area, the vehicle accident occurrence notification device 100 may determine whether the area where the accident of the vehicle has occurred is an expressway/vehicle-only road (S606).

In this connection, the expressway/vehicle-only road is only an example of an area where it is possible to recognize the accident in the vicinity, but it is difficult to offer help because of difficult access. In practice, the expressway/vehicle-only road may be set to another area where it is possible to recognize the accident in the vicinity, but it is difficult to offer the help because of the difficult access.

When the area where the accident of the vehicle has occurred is the expressway/vehicle-only road, the vehicle accident occurrence notification device 100 may determine whether the accident has occurred in the daytime (S607).

For example, when the accident has not occurred in the daytime, the vehicle accident occurrence notification device 100 may determine that the traffic volume is not high, thereby identifying the accident occurrence time.

For example, the vehicle accident occurrence notification device 100 may determine whether the accident has occurred at a time at which it is determined that it is difficult to offer the help because of a high traffic volume even when the accident has not occurred in the daytime.

When the accident has occurred in the daytime, the vehicle accident occurrence notification device 100 may determine whether a real-time traffic condition of the area where the accident has occurred is determined to be tied up, slow, or congested (S608).

For example, the vehicle accident occurrence notification device 100 may determine whether the real-time traffic condition is determined to be tied up, slow, or congested through the communication with the server that identifies a real-time traffic volume.

For example, the vehicle accident occurrence notification device 100 may determine whether the real-time traffic condition is determined to be tied up, slow, or congested using a method for determining the traffic volume using an image or the like of a region around the vehicle.

When the real-time traffic condition of the area where the accident has occurred is determined to be tied up, slow, or congested, the vehicle accident occurrence notification device 100 may not perform the sharing of the location of the vehicle and the transmission of the notification including the information on the occurrence of the accident (S605).

For example, when the real-time traffic condition of the area where the accident has occurred is determined to be tied up, slow, or congested, the vehicle accident occurrence notification device 100 may identify a current situation as a situation capable of accessing the accident vehicle and offering the help, and not perform the sharing of the location of the vehicle and the transmission of the notification including the information on the occurrence of the accident.

When the real-time traffic condition of the accident occurrence area is not determined to be tied up, slow, or congested, the vehicle accident occurrence notification device 100 may determine whether the vehicle provides a personalized service for the driver (S610).

When the area where the accident of the vehicle has occurred is not the expressway/vehicle-only road, the vehicle accident occurrence notification device 100 may determine that the area where the accident of the vehicle has occurred is a non-residential area (a farmland/a mountain/an island, and the like) (S609).

For example, when the area where the accident of the vehicle has occurred is not the expressway/vehicle-only road, the vehicle accident occurrence notification device 100 may determine that the area where the accident of the vehicle has occurred is an area where it is difficult to recognize the accident in the vicinity, such as the farmland, the mountain, the islands, and the like.

After determining that the area where the accident of the vehicle has occurred is the non-residential area (the farmland/the mountain/the island and the like), the vehicle accident occurrence notification device 100 may determine whether the vehicle provides the personalized service for the driver (S610).

When the vehicle does not provide the personalized service for the driver, the vehicle accident occurrence notification device 100 may transmit the notification including the location of the vehicle and the information on the occurrence of the accident to communication terminals corresponding to emergency contacts registered in a personalized service of another user (S611).

For example, when the personalized service for the driver of the vehicle is provided in the event of the accident, and thus, it is able to know information on emergency contacts registered by the driver in advance, the vehicle accident occurrence notification device 100 may share the information to the emergency contacts of the driver. However, when the personalized service for the driver of the vehicle is not provided in the event of the accident, because the information is not able to be shared with the emergency contacts of the driver, the vehicle accident occurrence notification device 100 may transmit the notification including the information on the occurrence of the accident through emergency contacts of another driver for whom a personalized service is provided for the accident vehicle.

When the vehicle provides the personalized service for the driver, the vehicle accident occurrence notification device 100 may determine whether communication terminals registered as the emergency contacts are registered in a manner of being classified based on the area where the accident has occurred (S612).

When the communication terminals registered as the emergency contacts are not registered in the manner of being classified based on the area where the accident has occurred, the vehicle accident occurrence notification device 100 may transmit the notification including the location of the vehicle and the information on the occurrence of the accident to the communication terminals corresponding to the emergency contacts registered in the personalized service of the driver (S613).

For example, the vehicle accident occurrence notification device 100 may efficiently notify the occurrence of the accident and cope with the accident by sharing the location of the vehicle and transmitting the notification including the information on the occurrence of the accident to a target that should receive the information on the occurrence of the accident first when the accident occurs specified by the driver in advance.

When the communication terminals registered as the emergency contacts are registered in the manner of being classified based on the area where the accident has occurred, the vehicle accident occurrence notification device 100 may transmit the notification including the location of the vehicle and the information on the occurrence of the accident to communication terminals corresponding to emergency contacts corresponding to the area where the accident has occurred (S614).

For example, by transmitting the notification including the location of the vehicle and the information on the occurrence of the accident to the communication terminals corresponding to the emergency contacts corresponding to the area where the accident has occurred, the vehicle accident occurrence notification device 100 may not transmit the notification to a target incapable of taking an action even when receiving the information on the occurrence of the accident because of a long distance.

Figure 7:
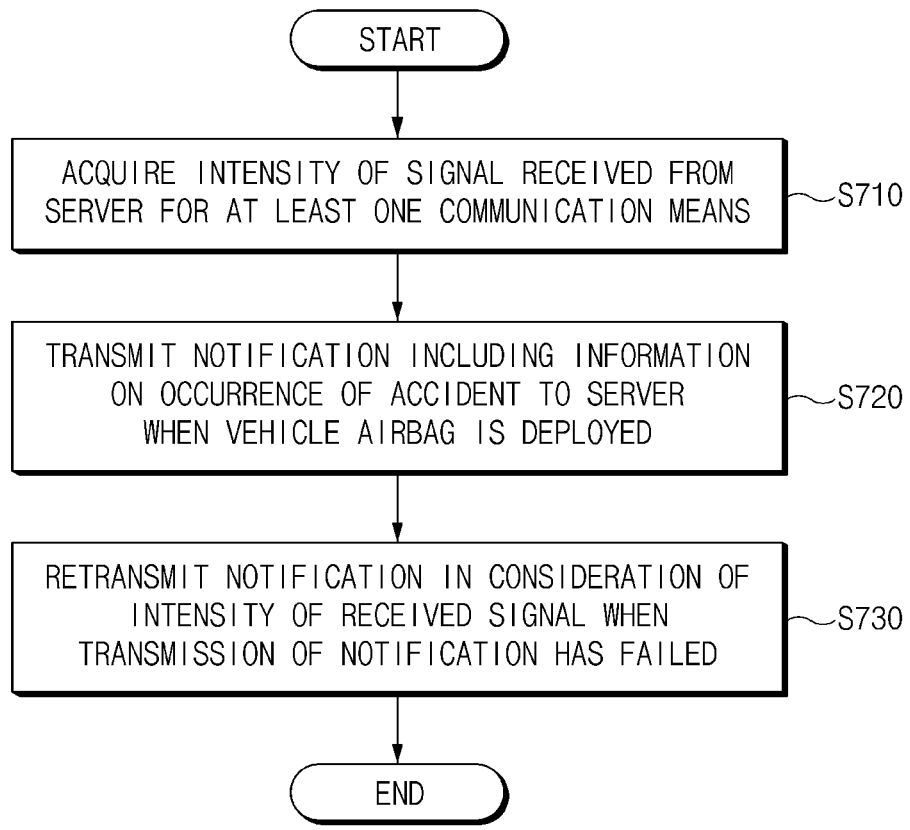
FIG. 7 is a flowchart illustrating a vehicle accident occurrence notification method according to an embodiment of the present disclosure.

FIG. 7 is a flowchart illustrating a vehicle accident occurrence notification method according to an embodiment of the present disclosure.

Referring to FIG. 7, a method for providing a notification of a vehicle emergency may include acquiring the intensity of the signal received from the server for at least one communication medium (S710), transmitting the notification including the information on the occurrence of the accident to the server when the vehicle airbag is deployed (S720), and retransmitting the notification based on the intensity of the received signal when the transmission of the notification has failed (S730).

For example, the acquiring of the intensity of the signal received from the server for at least one communication medium (S710) may include acquiring the signal to noise ratio of the signal received from the server for the communication medium.

For example, the retransmitting of the notification based on the intensity of the received signal when the transmission of the notification has failed (S730) may include retransmitting the notification the first number of reattempts through the communication medium when the signal to noise ratio exceeds the reference value, and retransmitting the notification the second number of reattempts through the communication medium when the signal to noise ratio does not exceed the reference value.

For example, the retransmitting of the notification based on the intensity of the received signal when the transmission of the notification has failed (S730) may include continuously repeating the transmission of the notification through the call connection until the transmission of the notification is successful when the signal to noise ratio exceeds the reference value and the connection is interrupted during the call in the process of transmitting or retransmitting the notification through the call connection.

Although not shown, the vehicle accident occurrence notification method may further include connecting the call through the communication terminal to the organization capable of requesting the rescue when the transmission and the retransmission of the notification have failed and the vehicle is connected to the communication terminal through the communication.

Figure 8:
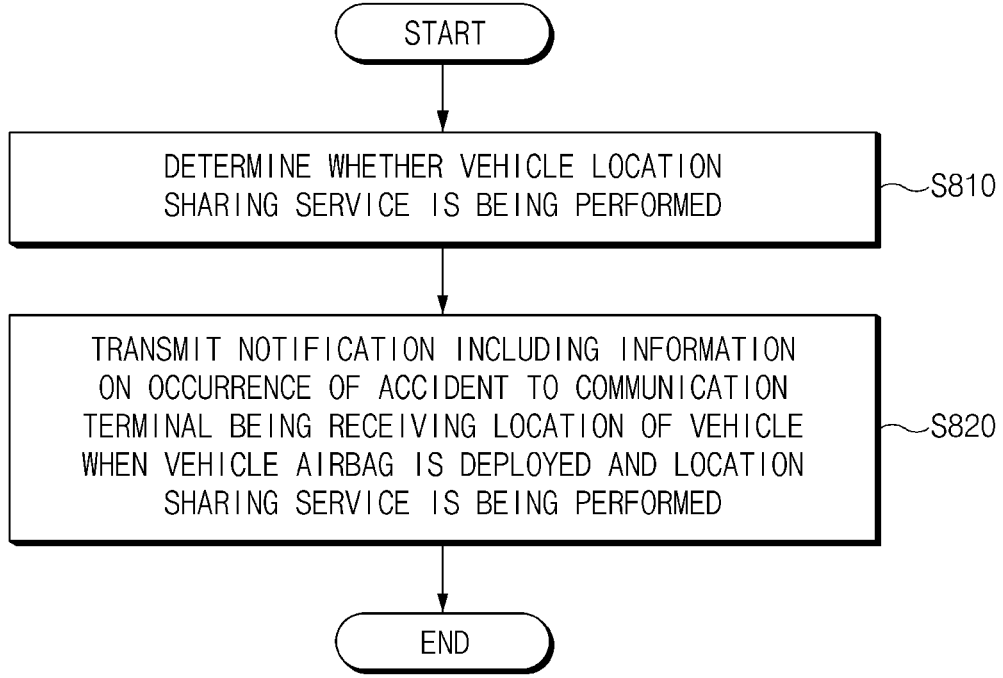
FIG. 8 is a flowchart illustrating a vehicle accident occurrence notification method according to another embodiment of the present disclosure.

FIG. 8 is a flowchart illustrating a vehicle accident occurrence notification method according to another embodiment of the present disclosure.

Referring to FIG. 8, a method for providing a notification of a vehicle accident may include determining whether the vehicle location sharing service is being performed (S810), and transmitting the notification including the information on the occurrence of the accident to the communication terminal sharing the location of the vehicle when the vehicle airbag is deployed and the location sharing service is being performed (S820).

Although not shown, the vehicle accident occurrence notification method may further include performing the location sharing service with the specific communication terminal based on the area where the accident has occurred, the time when the accident has occurred, and the traffic volume, and transmitting the notification including the information on the occurrence of the accident to the specific communication terminal when the airbag of the vehicle is deployed and the location sharing service is not being performed.

For example, the performing of the location sharing service with the specific communication terminal, and the transmitting of the notification indicating that the accident has occurred to the specific communication terminal may include performing the location sharing service with the specific communication terminal including the communication terminals registered as the emergency contacts of the driver of the vehicle through the personalized service when the vehicle provides the personalized service, and transmitting the notification including the information on the occurrence of the accident to the specific communication terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

Effects of the device and the method for providing a notification of the occurrence of the emergency accident of the vehicle according to the present disclosure will be described as follows.

According to at least one of the embodiments of the present disclosure, the device and the method for providing a notification of the occurrence of the emergency accident of the vehicle that, when the transmission of the notification including the information on the occurrence of the accident has failed because the wireless network communication is not operating correctly, reattempt to connect the wireless communication the appropriate number of times to increase the success rate may be provided.

In addition, according to at least one of the embodiments of the present disclosure, the device and the method for providing a notification of the occurrence of the emergency accident of the vehicle that attempt to notify the occurrence of the accident in the various methods by linking the accident occurrence notification with the vehicle location sharing service may be provided.

In addition, according to at least one of the embodiments of the present disclosure, the device and the method for providing a notification of the occurrence of the emergency accident of the vehicle that may effectively cope with the accident by providing a notification of the occurrence of the accident and transmitting the accident location to the different people based on the accident location may be provided.

In addition, according to at least one of the embodiments of the present disclosure, the device and the method for providing a notification of the occurrence of the emergency accident of the vehicle that may quickly and conveniently notify the acquaintances of the accident news by sharing the location and transmitting the accident occurrence notification to the emergency contacts on the contact list registered in the account of the driver may be provided.

In addition, various effects that are directly or indirectly identified through this document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for providing a notification of an occurrence of a vehicle accident, the device comprising:
    a communication device equipped in a vehicle, wherein the communication device is configured to:
    communicate with a server through at least one communication medium; and
    acquire a signal to noise ratio (SNR) of the signal received from the server for the communication medium; and
    communication medium; and
    a controller configured to:
    transmit a notification including information on the occurrence of the accident when an airbag of the vehicle is deployed to the server through the communication device;
    retransmit the notification through the communication device based on an intensity of a signal received from the server when the transmission of the notification has failed;
    retransmit the notification a first number of reattempts through the communication medium when the signal to noise ratio exceeds a reference value; and
    retransmit the notification a second number of reattempts, less than the first number of reattempts, through the communication medium when the signal to noise ratio does not exceed the reference value;
    wherein the controller is configured to:
    transmit the notification through the communication medium of a next priority when transmission of the notification and retransmission of the notification through communication medium of a specific priority have failed; and retransmit the notification through the communication medium of the next priority when the transmission of the notification through the communication medium of the next priority has failed.

2. The device of claim 1, wherein the communication medium includes at least one of a hyper text transfer protocol (HTTP) connection, a short message service (SMS) connection, or a call connection.

3. The device of claim 1, wherein the controller is configured to continuously repeat transmission of the notification through a call connection until the transmission of the notification is successful when the signal to noise ratio exceeds the reference value and the call connection is interrupted during a call while transmitting or retransmitting the notification through the call connection.

4. The device of claim 1, wherein the controller is configured to connect a call through a communication terminal to an organization capable of requesting a rescue when the transmission and the retransmission of the notification have failed, and the vehicle is connected to the communication terminal through communication.

5. The device of claim 1, wherein the controller is configured to provide a guide notification including at least one of a content indicating that the vehicle has entered a shadow area or a content of guiding a rescue request through a communication terminal to a user through the vehicle when the vehicle has entered a section determined as the shadow area.

6. The device of claim 5, wherein the controller is configured to attempt to transmit the notification through the communication device when the vehicle is out of the section determined as the shadow area, and a signal to noise ratio of a signal received from the server for the communication medium exceeds the reference value.

7. A method for providing a notification of an occurrence of a vehicle accident, the method comprising:

acquiring an intensity of a signal received from a server for at least one communication medium;

acquiring a signal to noise ratio of the signal received from the server for the communication medium;

transmitting a notification including information on the occurrence of the accident to the server when an airbag of a vehicle is deployed;

retransmitting the notification based on the intensity of the received signal when the transmission of the notification has failed, wherein the retransmitting includes;

retransmitting the notification a first number of reattempts through the communication medium when the signal to noise ratio exceeds a reference value; and retransmitting the notification a second number of reattempts, less than the first number of reattempts, through the communication medium when the signal to noise ratio does not exceed the reference value;

wherein the communication medium includes at least one of a HTTP connection, a SMS connection, or a call connection, wherein retransmitting the notification based on the intensity of the received signal when the transmission of the notification has failed further includes:

continuously repeating transmission of the notification through the call connection until the transmission of the notification is successful when the signal to noise ratio exceeds the reference value and the call connection is interrupted during a call while transmitting or retransmitting the notification through the call connection.

8. The method of claim 7, further comprising:

connecting a call through a communication terminal to an organization capable of requesting a rescue when the transmission and the retransmission of the notification have failed, and the vehicle is connected to the communication terminal through communication.

9. The method of claim 7, further comprising:

providing a guide notification including at least one of a content indicating that the vehicle has entered a shadow area or a content of guiding a rescue request through a communication terminal to a user through the vehicle when the vehicle has entered a section determined as the shadow area.

* * * * *